(12) United States Patent
Mennicken et al.

(10) Patent No.: US 11,366,442 B2
(45) Date of Patent: Jun. 21, 2022

(54) DIAGNOSTIC DEVICE AND DIAGNOSTIC METHOD FOR DIAGNOSING A FIELD DEVICE

(71) Applicant: Endress+Hauser Conducta GmbH+Co. KG, Gerlingen (DE)

(72) Inventors: Guido Mennicken, Leonberg (DE); Sebastian Schmidt, Stuttgart (DE); Ralf Steuerwald, Eberdingen (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 378 days.

(21) Appl. No.: 16/642,202

(22) PCT Filed: Aug. 28, 2018

(86) PCT No.: PCT/EP2018/073114
§ 371 (c)(1),
(2) Date: Feb. 26, 2020

(87) PCT Pub. No.: WO2019/042990
PCT Pub. Date: Mar. 7, 2019

(65) Prior Publication Data
US 2020/0356066 A1    Nov. 12, 2020

(30) Foreign Application Priority Data
Aug. 31, 2017   (DE) ..................... 10 2017 120 027.4

(51) Int. Cl.
G05B 19/04     (2006.01)
G05B 19/042    (2006.01)
(Continued)

(52) U.S. Cl.
CPC ......... G05B 19/0428 (2013.01); G01D 21/02 (2013.01); G01K 1/14 (2013.01);
(Continued)

(58) Field of Classification Search
CPC .. G05B 19/0428; G05B 19/042; G01D 21/02; G01D 3/08; G01D 21/00; G01K 1/14;
(Continued)

(56) References Cited

U.S. PATENT DOCUMENTS

2015/0088321 A1\* 3/2015 Schmidt .................... F16K 1/22
                                                    700/282
2017/0031329 A1\* 2/2017 Inagaki .................. B25J 9/1674

FOREIGN PATENT DOCUMENTS

DE          19953261 A1    5/2000
DE          10253564 A1    5/2004
(Continued)

*Primary Examiner* — Omar Casillashernandez
(74) *Attorney, Agent, or Firm* — Christopher R. Powers; Endress+Hauser (USA) Holding Inc.

(57) ABSTRACT

The present disclosure relates to a diagnostic device for a field device from the field of automation technology, comprising a control unit, a sensor carrier, a stereo acoustic sensor, which is fastened to the sensor carrier, a first temperature sensor, which is fastened at a first position on the sensor carrier, and a second temperature sensor, which is fastened at a second position on the sensor carrier. The first position and the second position are remote from one another owing to a first spacing. The sensor carrier is suitable for being expanded such that the first spacing is changed.

15 Claims, 4 Drawing Sheets

(51) Int. Cl.
  *G01D 21/02*  (2006.01)
  *G01K 1/14*   (2021.01)
  *G01N 29/14*  (2006.01)
  *H04W 84/18*  (2009.01)
(52) U.S. Cl.
  CPC ............ *G01N 29/14* (2013.01); *H04W 84/18* (2013.01); *G01K 2213/00* (2013.01)
(58) Field of Classification Search
  CPC ... G01K 2213/00; G01N 29/14; H04W 84/18; G01M 7/00; G01M 13/028
  USPC .......................................................... 700/79
  See application file for complete search history.

(56) References Cited

FOREIGN PATENT DOCUMENTS

| | | |
|---|---|---|
| RU | 85190 U1 | 7/2009 |
| WO | 9954794 | 10/1999 |

\* cited by examiner

DIAGNOSTIC DEVICE AND DIAGNOSTIC METHOD FOR DIAGNOSING A FIELD DEVICE

CROSS-REFERENCE TO RELATED APPLICATIONS

The present application is related to and claims the priority benefit of German Patent Application No. 10 2017 120 027.4, filed on Aug. 31, 2017 and International Patent Application No. PCT/EP2018/073114, filed on Aug. 28, 2018, the entire contents of which are incorporated herein by reference.

TECHNICAL FIELD

The invention relates to a diagnostic device and a diagnostic method for diagnosing a field device from the field of automation technology.

BACKGROUND

Known diagnostic devices and diagnostic methods use electrical characteristics of certain components (e.g. the resistance of a temperature sensor) in order to obtain information about its operability. Due to the direct or active intervention in the components to be diagnosed or their circuits, these diagnostic devices and diagnostic methods can also be called "active diagnostic devices" or "active diagnostic methods".

In what is known as an active diagnostic method, the user or service technician usually needs to measure various components directly or actively with the diagnostic device during the course of the method. With an ammeter as diagnostic device, a rising current consumption of an electric motor shortly before the end of its service life could be identified, for example.

What is known as the active diagnostic method, which is based on electrical characteristics which originate directly from the circuit of the component, is time-intensive and labor-intensive. It requires special expertise and many manual activities. In active diagnostic methods which require a supply of power to the field device, there is also an increased risk of accidents. The diagnostic method can moreover be performed only at defined maintenance intervals; a continuous diagnosis by the user or service technician is therefore not possible.

By contrast, what is known as a "passive" diagnostic device or diagnostic method is characterized by a passive diagnosis of the component, i.e. without intervening in the circuit of the component to be diagnosed. A generic passive diagnostic device or diagnostic method based on the evaluation of an audio signal is known from DE 102 53 564 A1.

However, known passive diagnostic devices or diagnostic methods do not allow a sufficient precision with regard to the spatial identification of the error source.

SUMMARY

It is thus an object of the invention to propose a diagnostic device and diagnostic method for the passive diagnosis of a field device which facilitate the local identification of an error source.

This object of the invention is achieved by the subject matter of the invention according to claim 1. The invention relates to a diagnostic device for a field device from the field of automation technology, comprising a control unit, a sensor carrier, a stereo acoustic sensor, which is fastened to the sensor carrier, a first temperature sensor, which is fastened on the sensor carrier at a first position, and a second temperature sensor, which is fastened on the sensor carrier at a second position. The first position and the second position are remote from one another owing to a first spacing. The sensor carrier is suitable for being expanded such that the first spacing is changed.

One advantage of the diagnostic device according to the invention is that a location-dependent identification of the error source becomes possible via the stereo acoustic sensor. It is thus possible not only to identify that an error is present, but also where this error is located in the field device. It is also possible to record additional location-dependent information via the first temperature sensor, which is arranged at the first position, and via the second temperature sensor, which is arranged spaced apart from the first position, at the second position. This further allows an easy spatial identification of the error source in the field device. In addition to this, the diagnostic device enables a contactless diagnostic method which can be implemented without special knowledge of electrical safety, and enables the detection of defined error states of the field device, and enables the provision of information about the wear state of individual components of the field device. In addition to this, the diagnostic device makes it possible that the operation of the field device does not necessarily need to be interrupted for the diagnosis.

In one development, the diagnostic device has a third temperature sensor, which is fastened to the sensor carrier at a third position, wherein the sensor carrier is suitable for being expanded in such a way that a second spacing between the first position and the third position and a third spacing between the second position and the third position are changed.

In one development, the diagnostic device has a fourth temperature sensor, which is fastened to the sensor carrier at a fourth position, wherein the sensor carrier is suitable for being expanded in such a way that a fourth spacing between the first position and the fourth position, and a fifth spacing between the second position and the fourth position, and a sixth spacing between the third position and the fourth position are changed.

According to one development, the diagnostic device furthermore comprises a magnetic field sensor.

According to one development, the diagnostic device furthermore comprises at least one of the sensors from the group consisting of photosensor, position sensor, acceleration sensor, GPS sensor, and pressure sensor.

According to one development, the control unit is suitable for outputting or wirelessly transmitting measurement data of the sensors or diagnostic messages.

The aforementioned object of the invention is also achieved by the subject matter of the invention according to claim 7.

The invention furthermore relates to a diagnostic method for diagnosing a field device from the field of automation technology, comprising the following steps:
  providing a diagnostic device according to the invention,
  expanding the sensor carrier of the diagnostic device in order to set a first spacing between the first position of the first temperature sensor and the second position of the second temperature sensor,
  placing the field device into operation,
  recording of a reference acoustic emission profile of the field device by the stereo acoustic sensor during a first time period, recording of a reference temperature profile by each temperature sensor during the first time period, storing the reference acoustic emission profile and the reference temperature profiles, recording of an operating acoustic emission profile by the stereo acoustic sensor during a second time period, recording of an operating temperature profile by each temperature sensor during the second time period, storing the operating acoustic emission profile and the operating temperature profiles, comparing the reference acoustic emission profile with the operating acoustic emission profile, comparing the reference temperature profiles with the operating temperature profiles, outputting a first diagnostic message if a deviation of the operating acoustic emission profile from the reference acoustic emission profile exceeds a maximum deviation, and/or if a deviation of an operating temperature profile from the reference temperature profiles exceeds a maximum deviation, wherein the outputting of the first diagnostic message includes a location-dependent identification of an error source.

An advantage of the diagnostic method according to the invention is that an error can be diagnosed on the basis of the comparison of the reference acoustic emission profile with the operating acoustic emission profile. In addition to this, thanks to the operating acoustic emission profile, a location-dependent identification of the error source is possible via the stereo acoustic sensor. In addition, an error can also be diagnosed on the basis of the comparison of the reference temperature profiles with the operating temperature profiles. Thanks to the expansion of the sensor carrier of the diagnostic device by a first spacing between the first position of the first temperature sensor and the second position, a location-dependent identification of the error source is additionally also possible here. In addition to this, the diagnostic method can be carried out without contact and without special knowledge of electrical safety, and detects defined faulty states of the field device and provides information about the wear state of individual components. The operation of the field device does not necessarily need to be interrupted for the diagnostic method.

In one development, the sensor carrier is expanded such that a second spacing between the first position of the first temperature sensor and the third position of the third temperature sensor is set, and a third spacing between the second position of the second temperature sensor and the third position of the third temperature sensor is set.

According to one development, the sensor carrier is expanded such that a fourth spacing between the first position of the first temperature sensor and the fourth position of the fourth temperature sensor is set, and a fifth spacing between the second position of the second temperature sensor and the fourth position of the fourth temperature sensor is set, and a sixth spacing between the third position of the third temperature sensor and the fourth position of the fourth temperature sensor is set.

According to one development, the diagnostic device is arranged in the field device, and the first spacing is set such that the positions of the temperature sensors coincide with corner points of the field device.

In one development, a reference magnetic field is recorded by a magnetic field sensor during the first time period, and an operating magnetic field is recorded during the second time period, wherein the operating magnetic field is compared with the reference magnetic field, and the first diagnostic message is output if a deviation of the operating magnetic field from the reference magnetic field exceeds a maximum deviation.

According to one development, a reference signal is recorded during the first time period by one of the sensors from the group of photosensor, position sensor, acceleration sensor, GPS sensor, and pressure sensor, and an operating signal is recorded during the second time period, wherein the operating signal is compared with the reference signal, and the first diagnostic message is output if a deviation of the operating signal from the reference signal exceeds a maximum deviation.

According to one development, a specific action instruction is issued depending on the location-dependent identification of the first diagnostic messages.

According to one development, in order to signal that the field device is free of error, a second diagnostic message is output if the deviation of the operating acoustic emission profile from the reference acoustic emission profile does not exceed the maximum deviation, and if the deviation of an operating temperature profile from the reference temperature profiles does not exceed the maximum deviation.

According to one development, the first and/or second diagnostic message are output as an optical and/or an acoustic signal.

BRIEF DESCRIPTION OF THE DRAWINGS

The present disclosure is explained in more detail based upon the following drawings. The following is shown.

DETAILED DESCRIPTION

Figure 1:
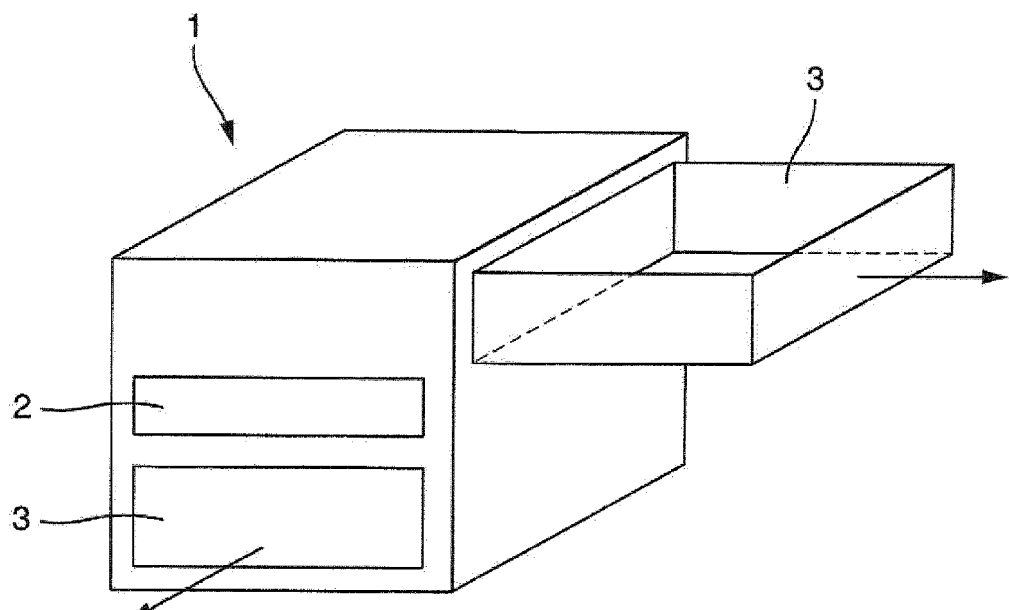
FIG. 1 shows a schematic depiction of the diagnostic device according to the present disclosure.
Figure 2:
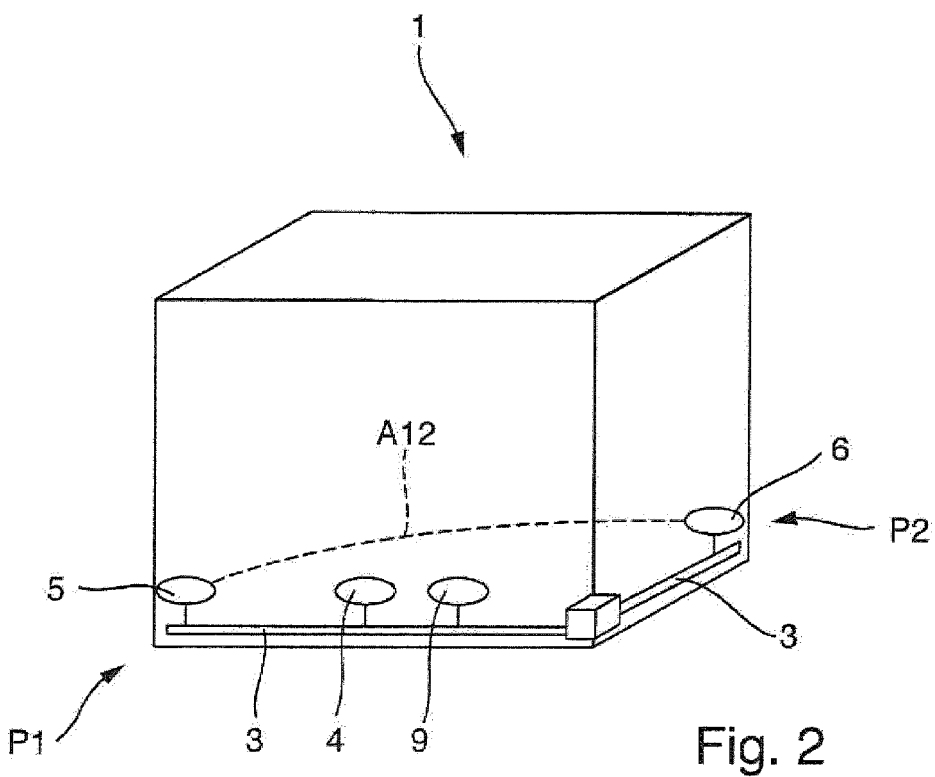
FIG. 2 shows a schematic depiction of an embodiment of a diagnostic device having a stereo acoustic sensor, two temperature sensors, and a magnetic field sensor.

FIGS. 1 and 2 schematically show a diagnostic device 1 for a field device from the field of automation technology in order to check the functionality of the field device. A malfunction of the field device may thus be detected early. The term "malfunction" is also to be understood in this description as meaning that states of the field device can be recognized before an error occurs, for example the failure of a component. A prevailing malfunction may thus also indicate a future error.

The diagnostic device 1 comprises a control unit 2, a sensor carrier 3, a stereo acoustic sensor 4, a first temperature sensor 5, and a second temperature sensor 6. The exemplary embodiment of FIG. 2 additionally shows a magnetic field sensor 9, which will be discussed later. The diagnostic device 1 is designed such that it may be accommodated in a field device. This means that the diagnostic device 1 is temporarily or permanently accommodated, for example in the housing of a field device. A temporary or permanent diagnosis of the field device is thus possible. The diagnostic device 1 may also be arranged outside of the field device. In the following, however, for the sake of simpler legibility, an arrangement of the diagnostic device in the field device shall be described.

The control unit 2 is electrically connected to the sensors in order to evaluate the signals measured by the sensors. The control unit 2 furthermore enables the output and wireless transmission of diagnostic messages, which are based on the evaluated signals measured by the sensors. The control unit 2 also enables the output and wireless transmission of measurement data of the sensors. A first diagnostic message informs a user that an error has been identified in the field device. A second diagnostic message informs the user that no error has been identified in the field device. How the error detection and generation of the diagnostic messages work will be explained later.

The sensor carriers 3 may be expanded, meaning folded open or extended, depending on the type of embodiment. A variant of a diagnostic device 1 having two telescoping sensor carriers 3 is depicted in FIG. 1. The two arrows indicate the direction of extension of the sensor carriers 3. In this embodiment, the direction of extension of the sensor carriers 3 is at right angles to one another. FIG. 1 shows a sensor carrier 3 in an extended position and a sensor carrier in an unextended position. As indicated by their name, the sensor carriers serve to bear the sensors of the diagnostic device 1. Sensors may be arranged at any positions on the sensor carriers.

A variant of a diagnostic device 1 having two unfoldable sensor carriers 3 is depicted in FIG. 2. At the connection point of the sensor carriers 3, these may be pivoted about the connection point in an articulated manner. It is also possible to equip the diagnostic device with more than two sensor carriers 3 (not shown). For example, it is thus possible to orient the sensor carriers 3 in different directions. The sensor carriers 3 may be pivoted in any desired directions by means of a joint, for example a ball joint. In addition, the sensor carriers 3 may be extendable, meaning that the sensor carriers 3 may be variable in length along their extension direction. The length variability of the sensor carriers 3 may be selected as desired. It is thus possible to adapt the diagnostic device to different field devices with differently dimensioned housings.

FIG. 2 shows the stereo acoustic sensor 4 arranged centrally on a sensor carrier 3. However, the stereo acoustic sensor 4 may also be arranged at any location on the sensor carrier 3 or the diagnostic device 1. The stereo acoustic sensor 4 enables the measurement of acoustic signals, which are processed and evaluated by the control unit 2. The evaluation of the acoustic signals of the stereo acoustic sensor 4 makes it possible to identify the origin of an acoustic source. The stereo acoustic sensor 4 comprises two acoustic sensors, which, for example, are arranged next to one another in two different directions. The two acoustic sensors may also be spaced further apart from one another.

FIG. 2 shows the first temperature sensor 5 at a first position P1, and the second temperature sensor 6 at a second position P2. The two temperature sensors 5, 6 are separated by a first spacing A12. This allows a temperature measurement to be implemented at different locations of the field device. A temperature gradient of the field device can thus be measured along a direction. The spatial distribution of the temperature sensors 5, 6 thus makes it possible to associate the temperature measurements with a certain location in the field device. Any number of temperature sensors may be arranged on each sensor carrier. For example, a temperature sensor may be arranged at each end of a sensor carrier. The first spacing A12 can be modified as desired. For example, the first spacing A12 can be modified by pivoting the sensor carriers, or by lengthening the sensor carriers in their respective direction of extension. The change in spacing is, of course, correspondingly possible if the diagnostic device 1 comprises more than two temperature sensors. If the temperature sensors are arranged along one, two, or three axes with the aid of sensor carriers, a 1-dimensional, 2-dimensional or 3-dimensional temperature distribution can be created in the field device, for example. A temperature gradient of the field device can thus be measured along a plurality of directions. This allows a precise local identification of possible sources of error.

FIG. 2 furthermore shows a magnetic field sensor 9 which is arranged on a sensor carrier 3. For example, a Hall sensor may be used as a magnetic field sensor. The magnetic field sensor 9 may alternatively also be arranged elsewhere in the diagnostic device 1. The magnetic field sensor 9 is suitable for measuring the magnetic field prevailing in its immediate surroundings. This prevailing magnetic field is distinguished on the one hand by the existing magnetic field of the Earth, but on the other hand also by the presence of electrical components which influence the magnetic field of the Earth. For example, a field device with an electric motor generates a magnetic field, which is perceived by the magnetic field sensor 9. The control unit 2 is suitable for evaluating the measurements of the magnetic field sensor 9 in order to detect malfunctions of the field device. An example of such an evaluation is described later (see also FIGS. 7 and 8).

Other sensors, for example a photosensor, a position sensor, an acceleration sensor, a GPS sensor, or a pressure sensor (not shown), may also be arranged on a sensor carrier 3 or elsewhere in the diagnostic device 1. As described by their names, these sensors make it possible to measure various physical or geographical information, and may be evaluated by the control unit 2 in order to detect malfunctions of the field device. The principal use of such sensors for evaluating the field device will be described later.

The diagnostic method of the field device for diagnosing a prevailing malfunction is described below.

First, the sensor carrier 3 or the sensor carriers of the diagnostic device 1 are expanded. The first spacing A12 is hereby set between the first position P1 of the first temperature sensor 5 and the second position P2 of the second temperature sensor 6. In the event that the diagnostic device 1 has a plurality of temperature sensors, predefined spacings are set between all temperature sensors. The diagnostic device 1 may be arranged in the field device or outside of the field device.

In the following, however, for the sake of simpler legibility, a method for using the diagnostic device in the field device shall be described. For the sake of readability, a diagnostic method with a stereo acoustic sensor 4 and temperature sensors 5, 6 is also described for the moment. If further sensors are present in the diagnostic device 1, the same corresponding steps may be undertaken for these sensors.

The field device is subsequently put into operation. At this point in time, it should be guaranteed that the field device functions without error.

Figure 3:
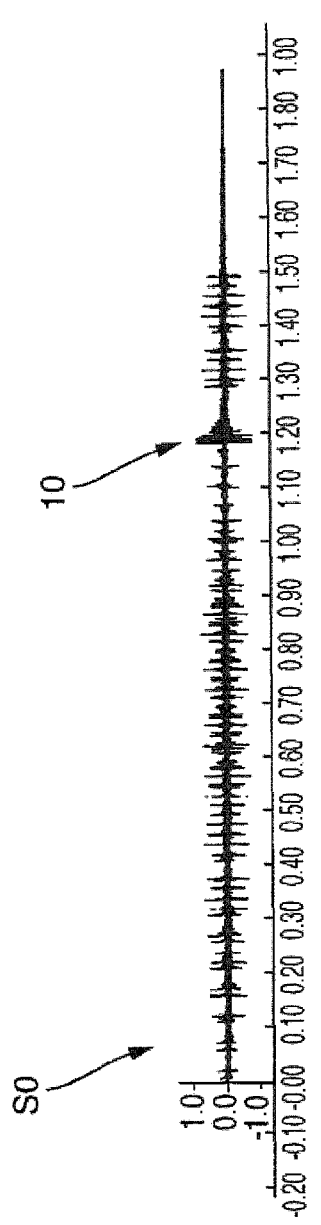
FIG. 3 shows a profile of a reference acoustic emission of a field device.

The stereo acoustic sensor 4 records a reference acoustic emission profile S0 of the field device during a reference time period (see FIG. 3). The reference acoustic emission profile S0 is respectively recorded by the stereo acoustic sensor 4 using a left acoustic sensor and a right acoustic sensor. This means that a "left" reference acoustic emission profile S0L is recorded by the left acoustic sensor, and a "right" reference acoustic emission profile S0R is recorded by the right acoustic sensor (see FIG. 5).

Figure 5:
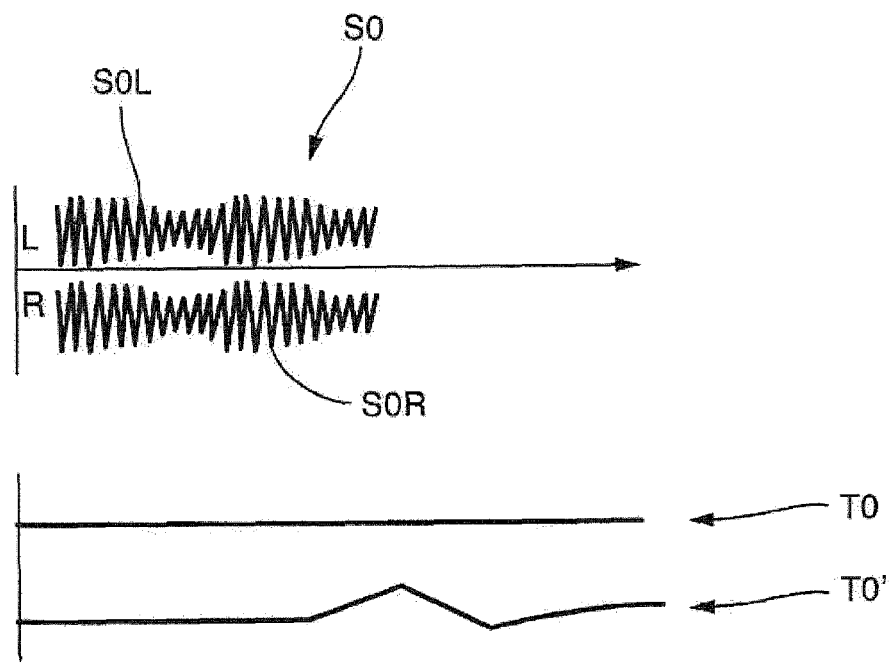
FIG. 5 shows examples of schematic profiles of a reference acoustic emission of a field device measured with a stereo acoustic sensor, of a reference temperature of a field device measured with two temperature sensors, of a reference magnetic field of a field device measured with a magnetic field sensor.

During the reference time period, a reference temperature profile T0, T0' is likewise recorded by each temperature sensor 5, 6 (see FIG. 5).

The reference acoustic emission profile S0 and the reference temperature profile T0, T0' are then stored by the control unit 2.

Figure 4:
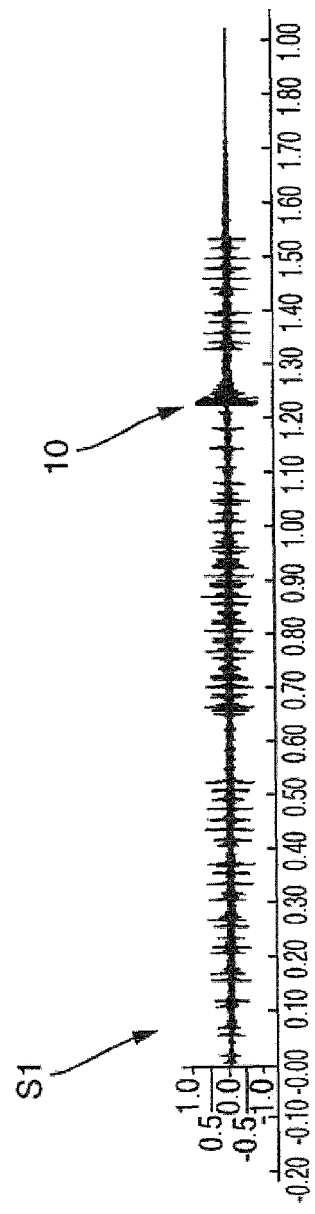
FIG. 4 shows a profile of an operating acoustic emission of a field device.
Figure 6:
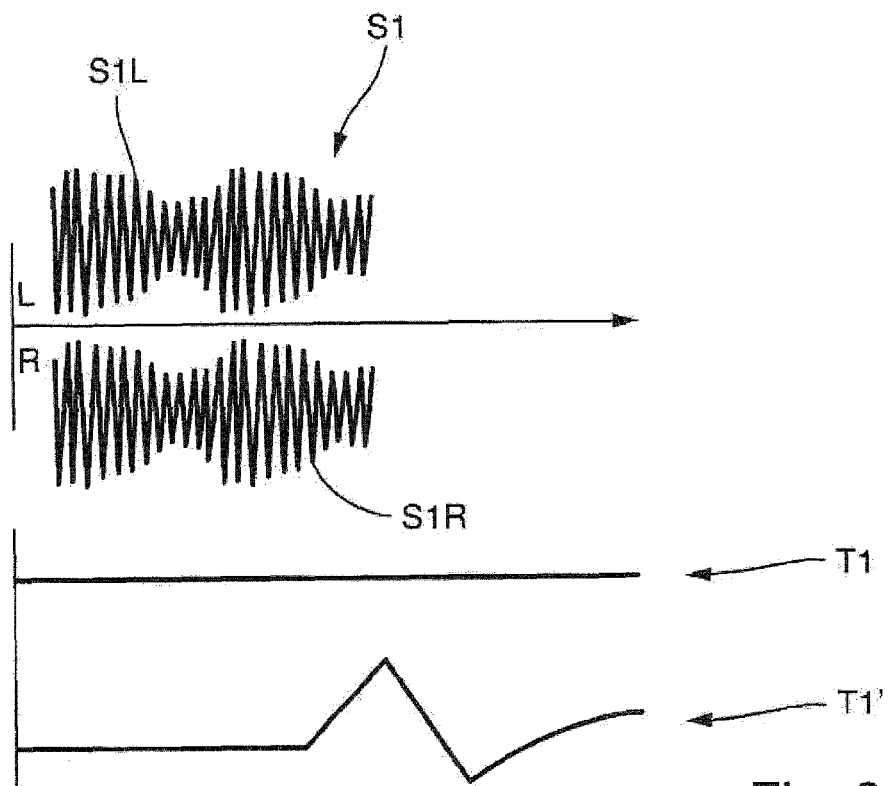
FIG. 6 shows examples of schematic profiles of an operating acoustic emission of a field device measured with a stereo acoustic sensor, of an operating temperature of a field device measured with two temperature sensors, of an operating magnetic field of a field device measured with a magnetic field sensor.

During an operating time period, the stereo acoustic sensor 4 then records and stores an operating acoustic emission profile S1, or S0L and S0R (see FIG. 4), and the operating temperature profiles T1, T1' are recorded and stored by each temperature sensor 5, 6 (see FIG. 4 and FIG. 6). The operating time period is recorded days or months after the reference time period, for example. The operating time period may be repeated, for example at regular points in time, in order to regularly check the field device for present errors.

The reference acoustic emission profile S0 is subsequently compared by the control unit 2 with the operating acoustic emission profile S1, and the reference temperature profiles T0, T0' are compared by the control unit 2 with the operating temperature profiles T1, T1'.

In the event that the comparison by the control unit 2 reveals that a deviation of the operating acoustic emission profile S1 from the reference acoustic emission profile S0 exceeds a maximum deviation, and/or if a deviation of an operating temperature profile T1, T1' from the reference temperature profiles T0, T0' exceeds a maximum deviation, the control unit 2 outputs a first diagnostic message. The first diagnostic message signals an error of the field device to the user. The maximum deviation is between 1% and 10% of the respective reference profile, for example.

In the event that the maximum deviation is not exceeded, the control unit can output a second diagnostic message. The second diagnostic message confirms to the user the absence of errors in the field device.

The first diagnostic message and the second diagnostic message may respectively be an optical and/or an acoustic signal, or an electromagnetic signal, for example a radio signal, WiFi signal, Bluetooth signal or the like.

The first diagnostic message includes location information for location-dependent identification of an error source. This location information is based on the analysis of the measured operating acoustic emission profile S1. The left operating acoustic emission profile S0L is hereby determined by the left acoustic sensor, and the right operating acoustic emission profile S0R is determined by the right acoustic sensor of the stereo acoustic sensor 4, with respect to its time-offset input in the left acoustic sensor relative to the right acoustic sensor. The error source of the field device may thus be spatially identified in a simple and precise manner.

In addition to this, the location information is based on the analysis of the measured operating temperature profiles T1, T1' depending on the position of the temperature sensor which has exceeded the maximum deviation. The error source of the field device may thus be spatially identified in a simple and precise manner.

Figure 7:
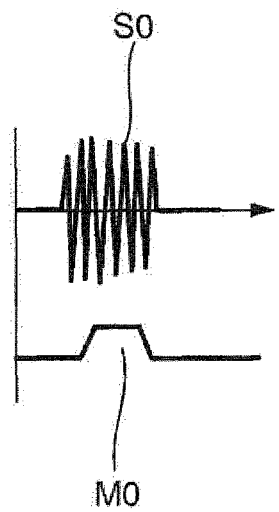
FIG. 7 shows an example of a schematic profile of a reference acoustic emission (above) and of a profile of a reference magnetic field (below) of an error-free field device with electric motor.
Figure 8:
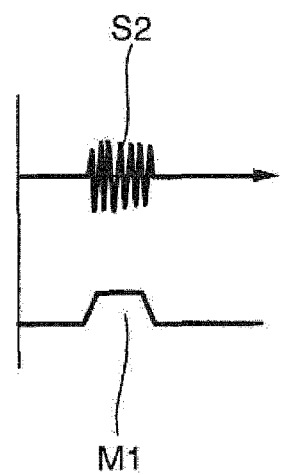
FIG. 8 shows an example of a schematic profile of an operating acoustic emission (above) and of a profile of an operating magnetic field (below) of an error-free field device with electric motor.

FIGS. 7 and 8 show an example of an additional diagnostic method. Here, a magnetic field sensor 9 is used together with the stereo acoustic sensor 4 for diagnosing faults in the field device. This additional diagnosis is particularly suitable given the presence of components in the field device which produce an electrical magnetic field, such as an electric motor.

FIG. 7 shows an example of a reference acoustic emission profile S0 and of a measured reference magnetic field M0. FIG. 8 shows an example of a measured operating acoustic emission profile S2 and of an operating magnetic field M1. However, it can be seen in FIG. 8 that the operating acoustic emission profile S2 is different than the reference acoustic emission profile S0. The magnetic field profiles M0 and M1 are virtually identical.

An evaluation of the acoustic emission profile S0, S2 indicates the failure of the electric motor, for example since the rotation noise of the shaft of the electric motor is missing. A failure of the electric motor can thus be diagnosed as an error solely with the aid of the acoustic emission profiles S0, S2. However, it remains unclear whether an error is based on an actuation problem of the electric motor or a load problem, for example a locking of the shaft.

However, thanks to the evaluation of the magnetic field profiles M0, M1, this ambiguity can be eliminated. Since the magnetic field profiles M0 and M1 are virtually identical, the driving of the electric motor also takes place properly during the operating time period.

A mechanical locking of the shaft of the electric motor must therefore be present.

Such an evaluation would not have been possible solely by evaluating the acoustic emission profiles or solely by evaluating the magnetic field profiles. Only the combination of both evaluations enables this precise and certain location of the error source.

The unexpected advantage which occurs as a result of evaluating the acoustic emission profiles S0, S2 and the simultaneous evaluation of the magnetic fields M0, M1 is an easier and more certain location of the error source.

In the event that the diagnostic device has additional sensors, a reference profile and operating profile are recorded, stored, and compared for these sensors as was described above for the acoustic sensor. In the event that a deviation beyond a defined maximum deviation is determined by the control unit 2, the control unit 2 outputs the first diagnostic message; otherwise, it outputs the second diagnostic message.

FIG. 3 shows two profiles of acoustic emissions of a field device during a defined duration. The upper or first profile shows a first acoustic emission of a field device given an error-free function of the field device. The lower or second profile shows a second acoustic emission of a field device with a malfunction. In this instance, the displayed first diagnostic message is "Field device faulty". For example, a malfunction might be the skipping of a specific screwing/hammering step.

Graphically, the difference between the first and second profiles is clear. The kick-drum-like peaks 10 shown in FIG. 3 are above before 1.20 seconds and below after 1.20 seconds, since the wave of the second profile is "out of time", that is to say slightly shifted in timing.

The following examples or faults may be distinguished by respectively different generated acoustic emission patterns, and a corresponding diagnostic message may be output depending on the error:

1. Error: Complete failure of a component, examples would be the dropout of a component or a severe imbalance of a rotating component. Diagnostic message: optical (red) and acoustic. Action instruction: Immediate deactivation of the field device and replacement of the affected component.

2. Error: A rotating component has insufficient lubrication.

Diagnostic message: Output an optical (orange) and acoustic signal. Action instruction: Grease component.

3. Error: A consumable part, for example the carbon brush of an engine, is mostly worn out.

Diagnostic message: Output of an optical (yellow) and acoustic signal. Action instruction: Order replacement parts.

4. Error: An air filter is mostly clogged, so that the fan needs to work against a high resistance. Diagnostic message: optical signal (blue) and acoustic signal. Action instruction: Clean the air filter If no fault is diagnosed, the second diagnostic message is output: no indication of a critical operating state. The second diagnostic message is an optical signal (green), for example. Action instruction: a defined status (e.g., heartbeat status=all's well).

The invention claimed is:

1. A diagnostic device for a field device from the field of automation technology, comprising:
   a control unit;
   a sensor carrier;
   a stereo acoustic sensor, which is fastened on the sensor carrier;
   a first temperature sensor, which is fastened to the sensor carrier at a first position; and
   a second temperature sensor, which is fastened to the sensor carrier at a second position,
   wherein the first position and the second position are remote from one other by a first spacing, and the sensor carrier is suitable for being expanded such that the first spacing is changed.

2. The diagnostic device according to claim 1, further comprising:
   a third temperature sensor, which is fastened to the sensor carrier at a third position,
   wherein the sensor carrier is suitable for being expanded in such a way that a second spacing between the first position and the third position as well as a third spacing between the second position and the third position are changed.

3. The diagnostic device according to claim 2, further comprising:
   a fourth temperature sensor, which is fastened to the sensor carrier at a fourth position,
   wherein the sensor carrier is suitable for being expanded in such a way that a fourth spacing between the first position and the fourth position, and a fifth spacing between the second position and the fourth position, and a sixth spacing between the third position and the fourth position are changed.

4. The diagnostic device according to claim 1, further comprising:
   a magnetic field sensor.

5. The diagnostic device according to claim 1, further comprising:
   at least one of the sensors from the group consisting of: a photosensor, a position sensor, an acceleration sensor, a GPS sensor, and a pressure sensor.

6. The diagnostic device according to claim 1, wherein the control unit is suitable for outputting or wirelessly transmitting measurement data of the sensors or diagnostic messages.

7. A diagnostic method for diagnosing a field device from the field of automation technology, comprising the following steps:
   providing a diagnostic device, including:
      a control unit;
      a sensor carrier;
      a stereo acoustic sensor, which is fastened on the sensor carrier;
      a first temperature sensor, which is fastened to the sensor carrier at a first position; and
      a second temperature sensor, which is fastened to the sensor carrier at a second position,
      wherein the first position and the second position are remote from one other by a first spacing, and the sensor carrier is suitable for being expanded such that the first spacing is changed;
   expanding the sensor carrier of the diagnostic device in order to set the first spacing between the first position of the first temperature sensor and the second position of the second temperature sensor;
   placing the field device into operation;
   recording a reference acoustic emission profile of the field device by the stereo acoustic sensor during a first time period;
   recording a reference temperature profile by each temperature sensor during the first time period;
   storing the reference acoustic emission profile and the reference temperature profile;
   recording an operating acoustic emission profile by the stereo acoustic sensor during a second time period;
   recording an operating temperature profile by each temperature sensor during the second time period;
   storing the operating acoustic emission profile and the operating temperature profile;
   comparing the reference acoustic emission profile with the operating acoustic emission profile;
   comparing the reference temperature profile with the operating temperature profile;
   outputting a first diagnostic message when a deviation of the operating acoustic emission profile from the reference acoustic emission profile exceeds a first maximum deviation; and
   outputting the first diagnostic message when a deviation of the operating temperature profile from the reference temperature profile exceeds a second maximum deviation,
   wherein the outputting of the first diagnostic message includes a location-dependent identification of an error source.

8. The diagnostic method according to claim 7,
   wherein the diagnostic device further includes:
      a third temperature sensor, which is fastened to the sensor carrier at a third position,
      wherein the sensor carrier is suitable for being expanded in such a way that a second spacing between the first position and the third position as well as a third spacing between the second position and the third position are changed,
   the method further comprising:

expanding the sensor carrier such that the second spacing between the first position of the first temperature sensor and the third position of the third temperature sensor is set, and the third spacing between the second position of the second temperature sensor and the third position of the third temperature sensor is set.

9. Diagnostic method according to claim 8,
wherein the diagnostic device further includes:
   a fourth temperature sensor, which is fastened to the sensor carrier at a fourth position,
   wherein the sensor carrier is suitable for being expanded in such a way that a fourth spacing between the first position and the fourth position, and a fifth spacing between the second position and the fourth position, and a sixth spacing between the third position and the fourth position are changed,
the method further comprising:
expanding the sensor carrier such that the fourth spacing between the first position of the first temperature sensor and the fourth position of the fourth temperature sensor is set, and the fifth spacing between the second position of the second temperature sensor and the fourth position of the fourth temperature sensor is set, and the sixth spacing between the third position of the third temperature sensor and the fourth position of the fourth temperature sensor is set.

10. The diagnostic method according to claim 9, wherein the diagnostic device is arranged in the field device, and the first spacing is set such that the positions of the temperature sensors coincide with corner points of the field device.

11. The diagnostic method according to claim 7,
wherein the diagnostic device further includes a magnetic field sensor, the method further comprising:
recording a reference magnetic field by the magnetic field sensor during the first time period;
recording an operating magnetic field during the second time period;
comparing the operating magnetic field with the reference magnetic field; and
outputting the first diagnostic message when a deviation of the operating magnetic field from the reference magnetic field exceeds a third maximum deviation.

12. The diagnostic method according to claim 7,
wherein the diagnostic device further includes at least one of the sensors from the group consisting of: a photosensor, a position sensor, an acceleration sensor, a GPS sensor, and a pressure sensor, the method further comprising:
recording a reference signal during the first time period by one of the sensors from the group of photosensor, position sensor, acceleration sensor, GPS sensor, and pressure sensor;
recording an operating signal during the second time period by one of the sensors from the group of photosensor, position sensor, acceleration sensor, GPS sensor, and pressure sensor;
comparing the operating signal with the reference signal; and
outputting the first diagnostic message when a deviation of the operating signal from the reference signal exceeds a fourth maximum deviation.

13. The diagnostic method according to claim 7, further comprising:
outputting a specific action instruction depending on the location-dependent identification of the first diagnostic message.

14. The diagnostic method according to claim 7, further comprising:
outputting a second diagnostic message when the deviation of the operating acoustic emission profile from the reference acoustic emission profile does not exceed the first maximum deviation; and
outputting the second diagnostic message when the deviation of an operating temperature profile from the reference temperature profiles does not exceed the second maximum deviation.

15. The diagnostic method according to claim 14, wherein the first and/or second diagnostic messages are output as an optical and/or an acoustic signal.

* * * * *